(12) United States Patent
Dardona et al.

(10) Patent No.: US 10,126,165 B2
(45) Date of Patent: Nov. 13, 2018

(54) RADIATION SENSORS

(71) Applicant: Carrier Corporation, Farmington, CT (US)

(72) Inventors: Sameh Dardona, South Windsor, CT (US); Marcin Piech, East Hampton, CT (US); Wayde R. Schmidt, Pomfret Center, CT (US); Antonio M. Vincitore, South Windsor, CT (US); Joseph V. Mantese, Ellington, CT (US); Rhonda R. Willigan, Manchester, CT (US); Peter R. Harris, West Hartford, CT (US); Jose L. Santana, Vernon, CT (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 15/217,955

(22) Filed: Jul. 22, 2016

(65) Prior Publication Data

US 2017/0030768 A1 Feb. 2, 2017

Related U.S. Application Data

(60) Provisional application No. 62/198,039, filed on Jul. 28, 2015.

(51) Int. Cl.
*G01J 1/42* (2006.01)
*G01J 1/02* (2006.01)

(52) U.S. Cl.
CPC ............. *G01J 1/429* (2013.01); *G01J 1/02* (2013.01)

(58) Field of Classification Search
CPC ......... G01J 1/429; G01J 1/02; H01L 31/0296; H01L 31/108
(Continued)

(56) References Cited

U.S. PATENT DOCUMENTS

| 4,090,177 A | | 5/1978 | Urata et al. |
| 5,183,973 A | * | 2/1993 | Ingle .................. H05K 1/09 |
| | | | 174/254 |

(Continued)

FOREIGN PATENT DOCUMENTS

| CN | 1400674 A | 3/2003 |
| CN | 100358159 C | 12/2007 |

(Continued)

OTHER PUBLICATIONS

<http://ieeexplore.ieee.org/xpl/article> titled *A Fire Detecting Method Based on Multi-Sensor Data Fusion* by Shaohau Chen, Hong Bao, Xianyun Zeng, Yimin Yang, Faculty of Automation, Guangdong University of Technology, Guangzhou, 510090, P.R. China, bhongg163.net <http://bhongg163.net>.

(Continued)

*Primary Examiner* — Taeho Jo
(74) *Attorney, Agent, or Firm* — Locke Lord LLP; Daniel J. Fiorello; Scott D. Wofsy

(57) ABSTRACT

In accordance with at least one aspect of this disclosure, an ultraviolet radiation (UV) sensor includes a UV sensitive material and a first electrode and a second electrode connected in series through the UV sensitive material such that UV radiation can reach the UV sensitive material. The UV sensitive material can include at least one of zinc tin oxide, magnesium oxide, magnesium zinc oxide, or zinc oxide. The electrodes can be interdigitated comb electrodes.

20 Claims, 5 Drawing Sheets

(58) Field of Classification Search
USPC ........................................................ 250/372
See application file for complete search history.

(56) References Cited

U.S. PATENT DOCUMENTS

| | | | |
|---|---|---|---|
| 5,339,070 A | 8/1994 | Yalowitz et al. | |
| 5,494,700 A | 2/1996 | Anderson et al. | |
| 5,699,035 A | 12/1997 | Ito et al. | |
| 5,830,412 A | 11/1998 | Kimura et al. | |
| 5,886,353 A * | 3/1999 | Spivey | A61B 6/4233 250/208.1 |
| 6,166,647 A | 12/2000 | Wong | |
| 6,239,435 B1 | 5/2001 | Castleman | |
| 6,255,651 B1 | 7/2001 | Laluvein et al. | |
| 6,358,378 B2 | 3/2002 | Choi et al. | |
| 6,518,077 B2 | 2/2003 | Narayan et al. | |
| 6,621,192 B2 | 9/2003 | Lu et al. | |
| 6,846,731 B2 | 1/2005 | Lu et al. | |
| 7,132,668 B2 | 11/2006 | Vispute et al. | |
| 7,172,813 B2 | 2/2007 | Burgener, II et al. | |
| 7,202,794 B2 | 4/2007 | Huseynov et al. | |
| 7,333,910 B2 | 2/2008 | Ishii | |
| 7,432,024 B2 | 10/2008 | Talin et al. | |
| 7,541,938 B1 | 6/2009 | Engelhaupt | |
| 7,566,875 B2 | 7/2009 | Starikov et al. | |
| 7,767,253 B2 | 8/2010 | Sharma | |
| 8,536,618 B2 | 9/2013 | Richardson et al. | |
| 8,878,157 B2 | 11/2014 | Wu et al. | |
| 8,926,317 B2 | 1/2015 | Farrell et al. | |
| 9,194,834 B2 * | 11/2015 | Gaudon | G01N 27/125 |
| 2003/0160176 A1 * | 8/2003 | Vispute | H01L 31/02240 250/372 |
| 2004/0246333 A1 * | 12/2004 | Steuart, III | G03B 35/08 348/36 |
| 2006/0163482 A1 * | 7/2006 | Mantese | G01J 5/34 250/338.2 |
| 2006/0183249 A1 | 8/2006 | Yao et al. | |
| 2006/0257286 A1 * | 11/2006 | Adams | G01N 29/022 422/82.01 |
| 2007/0042450 A1 * | 2/2007 | McGimpsey | B82Y 15/00 435/14 |
| 2007/0158608 A1 * | 7/2007 | Feltz | C04B 35/491 252/62.9 PZ |
| 2007/0175019 A1 * | 8/2007 | Rosc | H01C 1/1413 29/619 |
| 2008/0036593 A1 | 2/2008 | Rose-Pehrsson et al. | |
| 2008/0128632 A1 * | 6/2008 | Lee | G01J 1/429 250/372 |
| 2008/0220535 A1 * | 9/2008 | LeBoeuf | B82Y 30/00 436/164 |
| 2008/0307856 A1 * | 12/2008 | Chen | G01N 27/125 73/31.02 |
| 2009/0099436 A1 * | 4/2009 | Brister | A61B 5/14532 600/347 |
| 2009/0230443 A1 * | 9/2009 | Mochizuki | H01L 27/14632 257/292 |
| 2010/0095997 A1 * | 4/2010 | Weiss | H01L 35/26 136/238 |
| 2010/0276003 A1 | 11/2010 | Kawano et al. | |
| 2011/0048108 A1 * | 3/2011 | Yamagishi | G01N 33/0037 73/31.06 |
| 2011/0259080 A1 | 10/2011 | Ratcliffe et al. | |
| 2012/0001760 A1 | 1/2012 | Harchanko | |
| 2012/0043471 A1 * | 2/2012 | Harpring | G01T 7/00 250/394 |
| 2012/0091451 A1 * | 4/2012 | Kennedy | C01G 9/03 257/43 |
| 2013/0092933 A1 | 4/2013 | Nakamura | |
| 2013/0320467 A1 * | 12/2013 | Buchanan | G01N 29/022 257/419 |
| 2013/0341619 A1 | 12/2013 | Nakamura | |
| 2014/0061486 A1 * | 3/2014 | Bao | G01J 3/0213 250/370.01 |
| 2014/0070272 A1 * | 3/2014 | Knigge | H01L 31/02240 257/184 |
| 2014/0105790 A1 * | 4/2014 | Gaudon | G01N 27/125 422/90 |
| 2014/0284598 A1 | 9/2014 | Boutwell et al. | |
| 2014/0287147 A1 * | 9/2014 | Bartl | B05D 3/0254 427/374.1 |
| 2014/0291480 A1 * | 10/2014 | Bruder | G01C 3/06 250/206 |
| 2014/0319317 A1 * | 10/2014 | Lai | G01J 1/42 250/200 |
| 2015/0022592 A1 | 1/2015 | Aoyama et al. | |
| 2015/0171257 A1 | 6/2015 | Maekawa et al. | |
| 2015/0263203 A1 * | 9/2015 | Lewis | H01L 31/03521 257/21 |
| 2015/0340539 A1 * | 11/2015 | Koyama | H01L 31/1136 257/43 |
| 2015/0362464 A1 * | 12/2015 | Tanaka | G01N 29/022 73/649 |
| 2016/0007462 A1 * | 1/2016 | Culp | H05K 1/16 361/765 |
| 2016/0007474 A1 * | 1/2016 | Dardona | H05B 3/265 219/543 |
| 2016/0014900 A1 * | 1/2016 | Schmidt | H05K 1/16 361/760 |
| 2016/0187358 A1 * | 6/2016 | Tanaka | G01N 33/4905 435/13 |

FOREIGN PATENT DOCUMENTS

| | | |
|---|---|---|
| CN | 101210313 A | 7/2008 |
| CN | 101285147 A | 10/2008 |
| CN | 101285173 A | 10/2008 |
| CN | 101286535 A | 10/2008 |
| CN | 100561742 C | 11/2009 |
| CN | 101807619 A | 8/2010 |
| CN | 101866983 A | 10/2010 |
| CN | 101935876 A | 1/2011 |
| CN | 101969023 A | 2/2011 |
| CN | 102110735 A | 6/2011 |
| CN | 201964955 U | 9/2011 |
| CN | 102569483 A | 7/2012 |
| CN | 102694053 A | 9/2012 |
| CN | 202633358 U | 12/2012 |
| CN | 103205706 A | 7/2013 |
| CN | 103219418 A | 7/2013 |
| CN | 103258869 A | 8/2013 |
| CN | 103346171 A | 10/2013 |
| CN | 103346199 A | 10/2013 |
| CN | 103441154 A | 12/2013 |
| CN | 103441186 A | 12/2013 |
| CN | 103545397 A | 1/2014 |
| CN | 103915524 A | 7/2014 |
| CN | 103972310 A | 8/2014 |
| CN | 104504838 A | 4/2015 |
| CN | 104617180 A | 5/2015 |
| GB | 2222908 A | 3/1990 |
| JP | 2006278487 A | 10/2006 |
| JP | 2013-004674 A | 1/2013 |
| KR | 101009532 B1 | 1/2011 |
| KR | 101192934 B1 | 10/2012 |
| WO | WO-2010091703 A1 | 8/2010 |

OTHER PUBLICATIONS

<http://www.tradeindia.com/fp1824652/IR-UV-Flame-Detector.html,> ESP Safety Pvt. Ltd, Description/Specification of IR/UV Flame Detector.
<https://www.google.co.in>, Open Access algorithms ISSN 1999-4893 www.mdpi.com/journal <http://www.mdpi.com/journal> algorithms, Article in Algorithms 2014, 7, 523; doi:10.3390/a7040523 titled "Multi-Sensor Building Fire Alarm System with Information Fusion Technology Based on D-S Evidence Theory" by Qian Ding, Zhenghong Peng, Tianzhen Liu and Qiaohui Tong, School of Urban Design, Wuhan University, Bayi Road 16, Wuhan 430072, Hubei, China.

(56) References Cited

OTHER PUBLICATIONS

M.M. Fan et al.: "High-performance solar-blind ultraviolet photodetector based on mixed-phase ZnMgO thin film", Applied Physics Letters 105, 011117 (2014).

M. Wei, et al.: "Characteristics of ZnMgO thin films prepared by the Sol-gel method," Advanced Materials Research, 1662-8985, vols. 60-61, pp. 110-113, Jan. 20, 2009.

M. Caglar, et al.: "MgxZn1-x0 (x=0-1) films fabricated by sol-gel spin coating," Materials Reserach Bulleting 45, (2010), pp. 284-287.

Extended Search Report in connection with EP16181490.0 dated Jan. 4, 2017.

Y. N. Hou, et al.: "Monolithic color-selective ultraviolet (266-315 nm) photodetector based on a wurtzite MgxZn1-x0 film," Applied Physics Letters 105, 133510 (2014).

K. Hoggas, et al.: "Structural, microstructural, and optical properties of Zn1-xMgx0 thin films grown onto glass substrate by ultrasonic spray pyrolysis," Applied Physics A (2015) 120:745-755.

Partial Search report dated Jan. 5, 2017 in connection with EP Application No. EP16181398.5.

Chu T. T. et al.,: "Characterization of UV photodetectors with Mg"xZn" 1"@?"gr x0 thin fims," Microelectronic Engineering, Elsevier Publishers BV., Amsterdam, NL, vol. 87, No. 9, Nov. 1, 2010, pp. 1777-1780.

S. S. Hullavarad et al.,: "Realization of Mg(x=0.15)Zn(1-x=0.85)O-based metal-semiconductor-metal UV detector on quartz and sapphire," J. Vac. Sci. Technol. A23(4), Jul./Aug. 2005, American Vacuum Society, pp. 982-985.

H. Zuopeng, et al.: "Fabrication and characterization of MgxNi1-x1 thin fims by sol-gel dip-coating," Chinese Journal of Semiconductors, vol. 26, Issue 4, Apr. 2005, pp. 721-725 with English abstract.

Extended European Search Report dated Dec. 19, 2016, issued from European Patent Office in corresponding European Patent Application No. 16181769.7.

Suo Bai et al.: "High-Performance Integrated ZnO Nanowire UV Sensors on Rigid and Flexible Substrates", Advanced Functional Materials, Wiley—V C H Verlag GMBH & Co. KGAA, DE, vol. 21, No. 23, Dec. 6, 2011 (Dec. 6, 2011), pp. 4464-4469, XP001571417, ISSN: 1616-301X, DOI: 10.1002/ADFM.201101319.

Abdelrahim Ate et al: "Ultrafast and High Sensitive UV/IR Photodetector Based on a Single SnO 2 Nanowire", International Journal of Optoelectronic Engineering, Jan. 1, 2014 (Jan. 1, 2014), pp. 6-10, XP055326489, 001: 10.5923/j.ijoe.20140401.02.

Yanjun Zhang et at: "High performance ultraviolet photodetectors based on an individual Zn2SnO4 single crystalline nanowire",Journal of Materials Chemistry, vol. 20, No. 44, Jan. 1, 2010 (Jan. 1, 2010), p. 9858, XP055326623,GB ISSN: 0959-9428, DOI: 10.1039/c0jm02872j.

H. Zhu et at: "Metal-Oxide-Semiconductor-Structured MgZnO Ultraviolet Photodetector with High Internal Gain", Journal of Physical Chemnistry C, vol. 114, No. 15, Apr. 22, 2010 (Apr. 22, 2010), pp. 7169-7172, XP055326648, ISSN: 1932-7447, DOI: 10.1021/jp101083n.

Lee Keun et at: "Photosensitivity of solution-based indium gallium zinc oxide single-walled carbon nanotubes blend thin film transistors", Applied Physics Letters, A I P Publishing LLC, US, vol. 94, No. 10, Mar. 13, 2009 (Mar. 13, 2009), pp. 102112-102112,XP012118314, ISSN: 0003-6951, DOI: 10.1063/1.3098406.

\* cited by examiner

RADIATION SENSORS

CROSS-REFERENCE TO RELATED APPLICATION

This application claims the benefit of priority under 35 U.S.C. § 119(e) to U.S. Provisional Application No. 62/198,039, filed Jul. 28, 2015, which is incorporated herein by reference in its entirety.

BACKGROUND

1. Field

The present disclosure relates to sensors, more specifically to ultraviolet sensors (e.g., for flame detection).

2. Description of Related Art

Traditional ultraviolet (UV) sensors can be used to detect flames, for example, for use with flame and smoke detectors. Flames emit UV radiation which can be detected by a suitable sensor. However, traditional flame sensors are fragile, complicated, and expensive to manufacture compared to traditional smoke detectors. Consequently, integration of smoke alarm and flame sensor in commercial and residential applications has had limited success to date.

Such conventional methods and systems have generally been considered satisfactory for their intended purpose. However, there is still a need in the art for improved UV sensors. This can help to increase the adoption thereof in commercial and residential safety applications. The present disclosure provides a solution for this need.

SUMMARY

In accordance with at least one aspect of this disclosure, an ultraviolet radiation (UV) sensor includes a UV sensitive material and a first electrode and a second electrode connected in series through the UV sensitive material such that UV radiation can reach the UV sensitive material.

The UV sensitive material can include at least one of tin oxide, zinc tin oxide, magnesium oxide, magnesium zinc oxide, or zinc oxide. The electrodes can be interdigitated comb electrodes.

In certain embodiments, the UV sensitive material and the electrodes can be coplanar. For example, the UV sensitive material can be disposed in a space defined between the extensions of each comb electrode.

In certain embodiments, at least one of the electrodes and the UV sensitive material are at least partially transparent to UV radiation. For example, one or more of the electrodes can be UV-transparent electrodes.

The UV sensitive material can be a separate layer from the electrodes. In certain embodiments, each electrode can be separated by a layer of the UV sensitive material. In certain embodiments, the sensor can include a first layer of the UV sensitive material, a second layer having a second layer comb electrode with second layer comb electrode extensions, a third layer of UV sensitive material, and a fourth layer having a fourth layer comb electrode with fourth layer comb electrode extensions. Any suitable additional layers or reduction of layers are contemplated herein. For example, the sensor can further include a fifth layer of the UV sensitive material such that the fifth layer has a comb shape with fifth layer extensions that are less wide than the third layer.

The second layer comb electrode extensions can be narrower than the fourth layer comb electrode extensions or any other suitable width. In certain embodiments, the first layer can be a sheet and the third layer includes a comb shape with third layer extensions.

The sensor can have a planar shape, a curved shape such as cylindrical or elliptical, or any other suitable linear or nonlinear shape. For example, the sensor can have a curved shaped (e.g., cylindrical). In certain embodiments, the UV sensitive material can be disposed in a planar spiral relationship. Alternatively, sensor electrodes may have a spiral relationship on a cylindrical, hemi-spherical or otherwise non-planar concave or convex surface.

In certain embodiments, the sensor can include a conductive film separated from the electrodes by a dielectric for sensing capacitance between the conductive film and the electrodes. In certain embodiments, the dielectric can include the UV sensing material.

In accordance with at least one aspect of this disclosure, a method for manufacturing an ultraviolet (UV) sensor includes printing a UV sensitive material on or within a plurality of electrodes. In certain embodiments, the method can include printing the electrodes as described herein.

The sensitive material can be deposited or printed in a space between a plurality of electrode extensions. The method can further include forming the UV sensitive material to be coplanar with the electrodes to form a sensor layer. The method can include forming a plurality of the sensor layers one on top of another such that each sensor layer is electrically separated by the UV sensitive material but UV radiation is allowed to pass through each layer to reach the UV sensitive material in each sensor layer.

In accordance with at least one aspect of this disclosure, a radiation sensor includes a radiation sensitive material configured to be sensitive to one or more wavelengths of radiation and a first electrode and a second electrode connected in series through the radiation sensitive material such that radiation can reach the radiation sensitive material.

The radiation sensitive material can exhibit a greater absorbance of ultraviolet radiation than other adjacent radiation wavelength bands. A radiation sensitive material absorbance can decrease above wavelengths of about 200 nm. For example, the radiation sensitive material absorbance is at least about ten times higher at a portion of a band of wavelengths between about 100 nm and about 400 nm versus a band of wavelengths above 400 nm. In certain embodiments, the absorbance can drop about 80% at wavelengths higher than about 325 nm.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
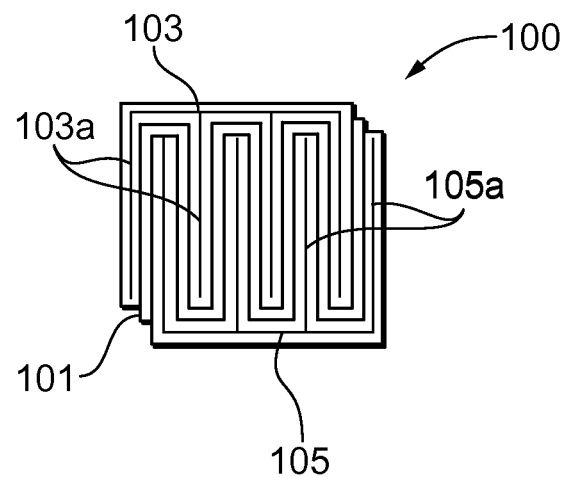
FIG. 1 is a plan view of an embodiment of a sensor in accordance with this disclosure, showing UV sensitive material disposed between first and second electrode extensions in a planar configuration.

Reference will now be made to the drawings wherein like reference numerals identify similar structural features or aspects of the subject disclosure. For purposes of explanation and illustration, and not limitation, an illustrative view of an embodiment of a UV sensor in accordance with the disclosure is shown in FIG. 1 and is designated generally by reference character 100. Other embodiments and/or aspects of this disclosure are shown in FIGS. 2A-7 The systems and methods described herein can be used to reduce the cost and improve the performance of electromagnetic radiation sensors (e.g., UV sensors for flame detection).

In accordance with at least one aspect of this disclosure, an ultraviolet radiation (UV) sensor 100 includes a UV sensitive material 101, a first electrode 103, and a second electrode 105 connected in series through the UV sensitive material 101 such that UV radiation can reach the UV sensitive material 101. As described herein, the UV sensitive material is configured to change a material property (e.g., conductivity) as a function of UV radiation exposure.

In certain embodiments, the UV sensitive material 101 can include at least one of tin oxide, zinc tin oxide, magnesium oxide, magnesium zinc oxide, or zinc oxide. Any other suitable material is contemplated herein for use in the sensitive material 101, however, certain materials can be selected to minimize response to radiation other than UV (e.g., visible light, IR).

As shown, the electrodes 103, 105 can be interdigitated comb electrodes. This creates a space between each electrode extension 103a, 105a such that electrodes 103, 105 are not in direct electrical communication. The space between each electrode extension 103a, 105a can be selected to create a predetermined resistance (e.g., the smaller the spaces, the larger the current flow will be between electrodes 103a, 105a). Any other suitable shape of electrodes 103, 105 is contemplated herein.

In certain embodiments, as shown in FIG. 1, the UV sensitive material 101 and the electrodes 103, 105 can be coplanar. For example, the UV sensitive material 101 can be disposed in the space defined between the electrode extensions 103a, 105a of each electrode 103, 105. Such a planar design can reduce the profile of the sensor and allow for wrapping, curving, and/or bending of the sensor 100 to any suitable shape.

The UV sensitive material 101 can be a separate layer from the electrodes 103, 105. In certain embodiments, each electrode can be separated by a layer of the UV sensitive material 101. For example, referring to FIGS. 2A and 2B, a sensor 200 can include plurality of layers such that the sensor 200 has a stack or sandwich structure. For example, the sensor 200 includes a first layer 202 of the UV sensitive material 101, a second layer 204 having a second layer comb electrode 203 with second layer comb electrode extensions 203a, a third layer 206 of UV sensitive material 101, and a fourth layer 208 having a fourth layer comb electrode 205a with fourth layer comb electrode extensions 205a. As shown, the comb electrode extensions 203a, 205a can be interdigitated for each electrode, but any suitable electrode shape is contemplated herein (e.g., a perimeter shape defining and opening in the middle, a layer with a plurality of holes defined therethrough). The layers 202, 206 can have any suitable shape (e.g., interdigitated material extensions as shown).

Figure 2A:
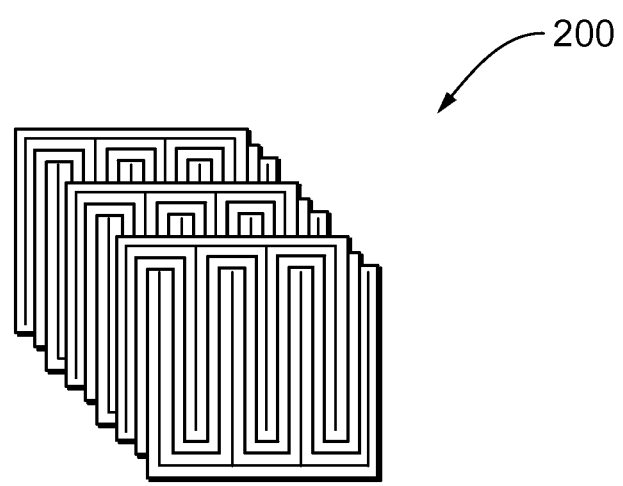
FIG. 2A is a partially exploded perspective view of another embodiment of a sensor with multiple sensing layers in accordance with this disclosure.
Figure 2B:
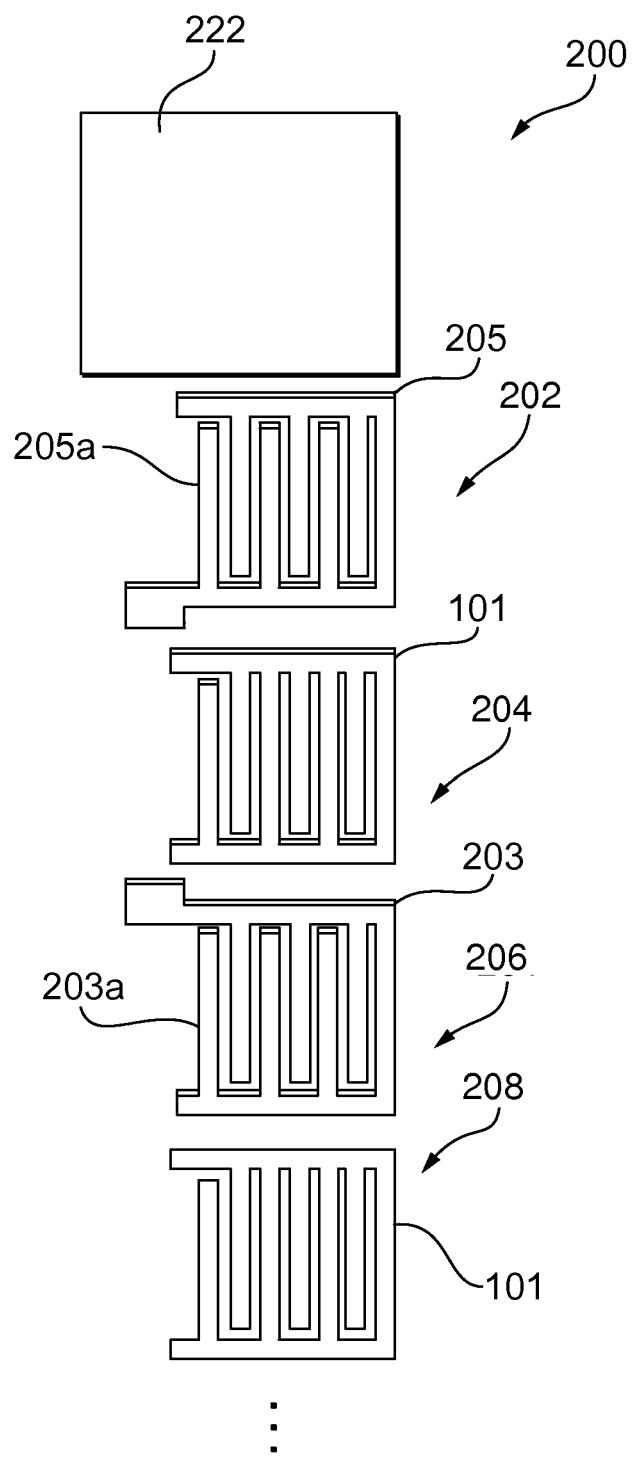
FIG. 2B is an exploded plan view of each layer of the sensor of FIG. 2A.

In certain embodiments, as shown in FIG. 2B, a dielectric layer 222 can be included at a bottom of the sensor 200. This dielectric layer 222 may be reflective to enhance light collection by the sensor 200. In certain embodiments, the dielectric layer 222 can be made from the UV sensitive material 101, however, any other suitable dielectric material is contemplated herein.

Figure 3:
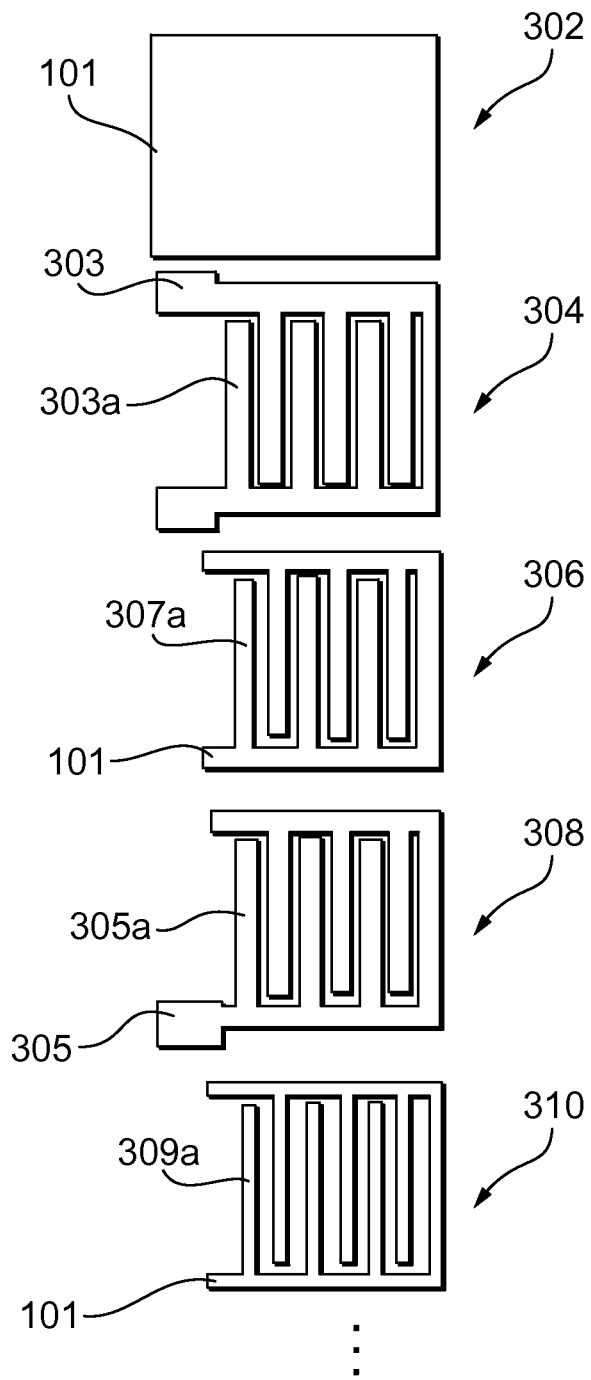
FIG. 3 is an exploded plan view of each layer of another embodiment of a sensor in accordance with this disclosure, shown having air gaps increasing in size with each successive layer toward the outer surface.
Figure 4:
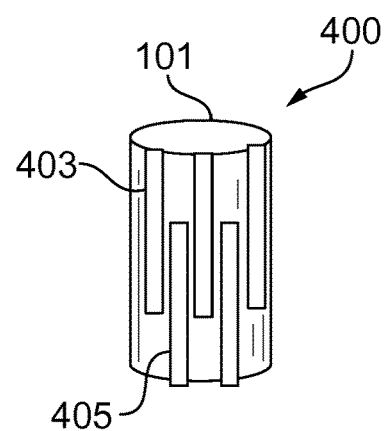
FIG. 4 is a perspective view of another embodiment of a sensor in accordance with this disclosure, shown having a curved shape.

Referring to FIG. 3, an embodiment of a sensor 300 can include a tapered construction such that layers toward the front of the device allow more UV radiation through to reach the back layers. For example, the fourth layer 308 can include a fourth layer comb electrode 305 with second layer comb electrode extensions 305a that are narrower than the second layer comb electrode extensions 303a of a second layer comb electrode 303 (e.g., to have larger spaces in the fourth layer 308 to allow more radiation to reach the first, second, and third layers 302, 304, 306). However, it is contemplated that each electrode extension 303a, 305a (or UV sensitive material extension) can have any suitable width, shape, and/or other dimensions relative to other extensions.

In certain embodiments, the first layer 302 can be a sheet of UV sensitive material 101 and the third layer 306 includes a comb shape with third layer extensions 307a of the UV sensitive material 101. As shown, the sensor 300 can further include a fifth layer 310 of the UV sensitive material 101. The fifth layer 310 can have a comb shape with fifth layer extensions 309a that are less wide than the third layer 306. As described above, any other suitable shape for each layer of UV sensitive material is contemplated herein.

While the embodiments disclosed herein show a discrete number of layers (e.g., four, five), any suitable additional layers or reduction of layers is contemplated herein (e.g., two, three, ten). Further, certain stack or sandwich structures as shown in FIGS. 2 and 3 can allow for sensitivity through a side of the stack as well as through the front and/or back.

In certain embodiments, at least one of the electrodes 103, 105, 303, 305 and the UV sensitive material 101 can be at least partially transparent to UV radiation (e.g., to enhance passage of UV radiation to layers in a stack). For example, one or more of the electrodes 103, 105, 303, 305 as described hereinabove can be made of any suitable transparent electrode material and/or in any suitable thickness to be partially transparent. For example, if the layers are made sufficiently thin (e.g., about less than 10 nm), certain transition metal oxides may be partially transparent. Any other suitable opacity is contemplated herein.

As described above, the sensor 100 can have any suitable shape. For example, referring to FIG. 4, sensor 400 can have a curved shaped (e.g., cylindrical, conical, tubular, non planar, hemispherical). For example, sensor layers may be directly deposited or printed onto a suitable non-planar shape. Alternatively, a planar sensor (e.g., sensor 100) can be deposited or printed on a flexible foil and can be wrapped to form curved sensor 400. As shown, a solid piece of UV sensitive material 101 can be wrapped with comb electrodes 403, 405 (e.g., electrodes 403, 405 can be printed on to material 101). Any other suitable three-dimensional shape (e.g., rectilinear shapes, spherical) is contemplated herein. Such three-dimensional shapes can allow UV radiation to reach the UV sensitive material 101 from multiple angles and thereby increase the field of view without a focusing lens.

Figure 5:
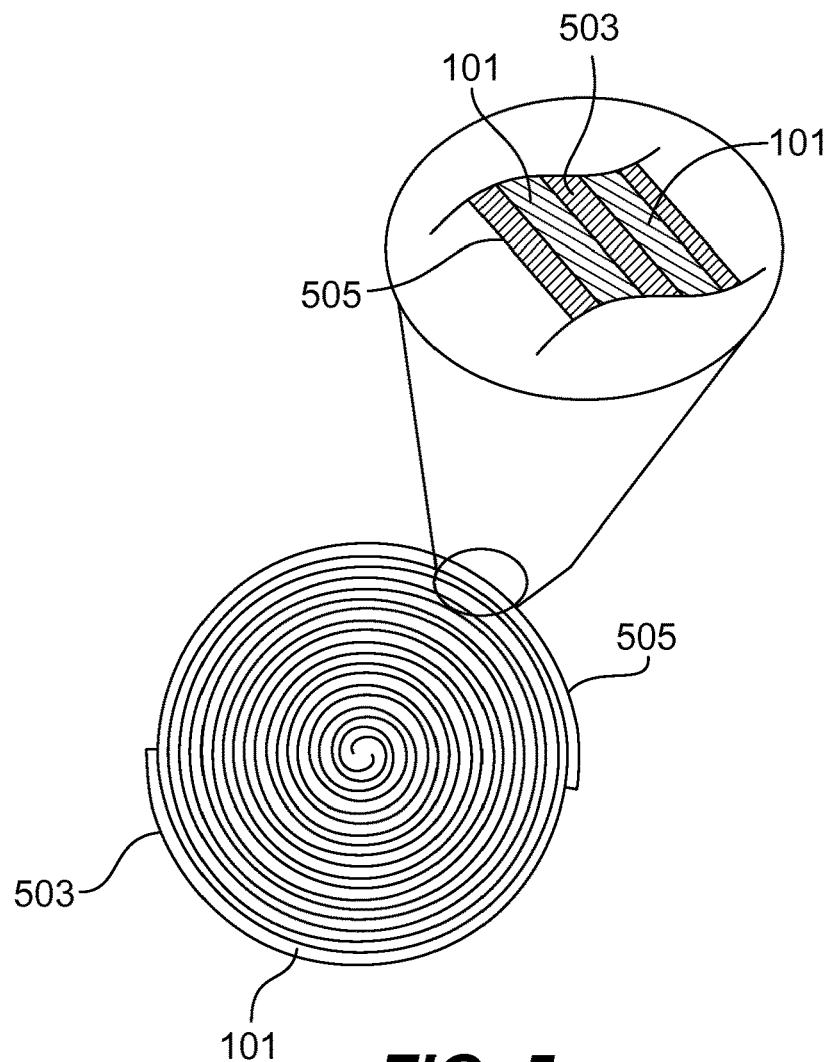
FIG. 5 is a plan view of another embodiment of a sensor in accordance with this disclosure, shown having a planar spiral shape.

In another embodiment, referring to FIG. 5, the UV sensitive material 101 can be disposed in a planar spiral relationship with the electrodes 503, 505. Any other suitable planar arrangement is contemplated herein. As described above, the spiral electrodes 503, 505 and UV sensitive material 101 may be deposited or printed onto any suitable non-planar shape (e.g., cylindrical, conical, hemispherical, rectilinear shapes, spherical).

Figure 6:
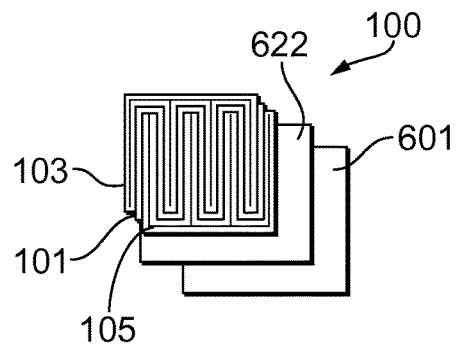
FIG. 6 is partially exploded perspective view of another embodiment of a sensor in accordance with this disclosure, showing a conductive layer disposed in a capacitive relationship with the electrodes.

Referring to FIG. 6, the sensors as described above (e.g., sensor 100 as shown) can include a conductive film 601 separated from the electrodes 103, 105 by a dielectric layer 622 for sensing capacitance between the conductive film 601 and the electrodes 103, 105. In certain embodiments, the dielectric can be the UV sensing material 101, but any other suitable dielectric (e.g., air, UV sensitive material 101, or another insulator) is contemplated herein. The conductive film 601 may be the same material as the electrodes as described herein or any other suitable conductive material.

Sensors and/or components thereof as described above can be manufactured in any suitable manner. For example, sensors and/or components thereof as described above can be printed, sprayed, spin-coated, dipped, etched, or formed in any other suitable manner.

In accordance with at least one aspect of this disclosure, a method for manufacturing an ultraviolet (UV) sensor 100 includes deposition or printing a UV sensitive material 101 on or within a plurality of electrodes 103, 105. In certain embodiments, the method can include deposition or printing the electrodes 103, 105 having any suitable construction as described above.

For example, the UV sensitive material 101 can be deposited or printed in a space between a plurality of electrode extensions 103a, 105a. The method can further include forming the UV sensitive material 101 to be coplanar with the electrodes 103a, 105a to form a sensor layer. The method can include forming a plurality of the sensor layers one on top of another such that each sensor layer is electrically separated by the UV sensitive material 101 but UV radiation is allowed to pass through each layer to reach the UV sensitive material 101 in each sensor layer.

Figure 7:
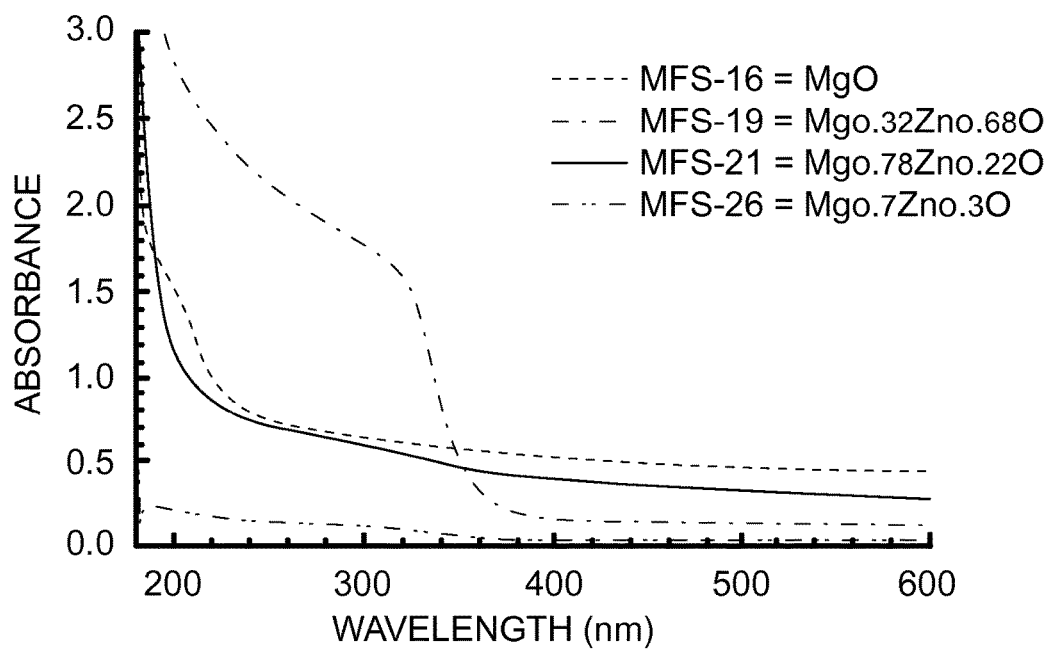
FIG. 7 is a graph showing absorption of various embodiments of magnesium zinc oxide semiconductors.

Referring to FIG. 7, the UV sensitive material can exhibit a greater absorbance of ultraviolet radiation than other adjacent radiation wavelength bands (e.g., visible wavelengths, x-ray wavelengths). As shown in FIG. 7, a UV sensitive material absorbance can decrease above wavelengths of about 200 nm for various magnesium zinc oxide compositions. For example, the UV sensitive material absorbance can be at least about ten times higher at a portion of a band of wavelengths between about 100 nm and about 400 nm versus a band of wavelengths above 400 nm. In certain embodiments, the absorbance can drop about 80% at wavelengths higher than about 325 nm for certain zinc tin oxide compounds. (See "Caihong Liu, Haiyan Chen, Zheng Ren, Sameh Dardona, Martin Piech, Haiyong Gao and Pu-Xian Gao, Controlled Synthesis and Structure Tunability of Photocatalytically Active Mesoporous Metal-based Stannate Nanostructures, Appl. Surf. Sci., 2014, 296, 53-60.").

While the embodiments hereinabove are described as being configured for UV radiation sensing, it is contemplated that certain embodiments of sensors can be configured (e.g., via suitable material selection of the sensitive material) to be sensitive to any other wavelength of radiation (e.g., visible, infrared).

The methods and systems of the present disclosure, as described above and shown in the drawings, provide for radiation sensors with superior properties including improved performance and reduced cost. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An ultraviolet (UV) radiation sensor, comprising:
at least one layer of UV radiation sensitive material; and
at least a first electrode and a second electrode connected in series through the UV radiation sensitive material such that UV radiation can reach the UV radiation sensitive material,
wherein the UV radiation sensitive material is a separate layer from the electrodes, wherein each electrode is a separated by a layer of the UV radiation sensitive material, wherein the at least one layer of UV radiation sensitive material and the at least first electrode and second electrode include:
a first layer of the UV radiation sensitive material;
a second layer having a second layer comb electrode with second layer comb electrode extensions;
a third layer of UV radiation sensitive material; and
a fourth layer having a fourth layer comb electrode with fourth layer comb electrode extensions.

2. The sensor of claim 1, wherein the UV radiation sensitive material includes at least one of tin oxide, zinc tin oxide, magnesium oxide, magnesium zinc oxide, or zinc oxide.

3. The sensor of claim 2, wherein at least one of the electrodes and the UV radiation sensitive material are at least partially transparent to UV radiation.

4. The sensor of claim 1, wherein the UV radiation sensitive material is disposed in a space defined between the electrode extensions of each electrode.

5. The sensor of claim 1, wherein the fourth layer comb electrode extensions are narrower than the second layer comb electrode extensions.

6. The sensor of claim 5, wherein the first layer is a sheet, wherein the third layer includes a comb shape with third layer extensions.

7. The sensor of claim 6, further including a fifth layer of the UV radiation sensitive material, wherein the fifth layer has a comb shape with fifth layer extensions that are less wide than the third layer.

8. The sensor of claim 1, wherein the sensor has a curved shaped.

9. The sensor of claim 1, wherein the curved shape is cylindrical.

10. The sensor of claim 1, further including a conductive film separated from the electrodes by a dielectric for sensing capacitance between the conductive film and the electrodes.

11. The sensor of claim 1, wherein the UV radiation sensitive material is disposed in a planar spiral relationship with the plurality of electrodes.

12. A method for manufacturing an ultraviolet (UV) sensor, comprising:
depositing or printing a UV sensitive material on or within a plurality of electrodes, wherein the electrodes are interdigitated and the UV sensitive material is deposited or printed in a space between a plurality of electrode extensions, wherein depositing or printing the UV sensitive material includes forming the UV sensitive material to be coplanar with the electrodes to form a sensor layer.

13. The method of claim 12, further comprising depositing or printing the electrodes.

14. The method of claim 12, further comprising forming a plurality of the sensor layers one on top of another such that each sensor layer is electrically separated by the UV sensitive material but UV radiation is allowed to pass through each layer to reach the UV sensitive material in each sensor layer.

15. A radiation sensor, comprising:
a radiation sensitive material configured to be sensitive to one or more wavelengths of radiation; and
a first electrode and a second electrode connected in series through the radiation sensitive material such that radiation can reach the radiation sensitive material, wherein the sensor includes a three-dimensional shape such that a field of view of the radiation sensor is increased and allows radiation to reach the radiation sensitive material from multiple angles, wherein the sensor includes a planar sensor deposited or printed on a flexible foil that is wrapped to form a conformal sensor on the three dimensional shape.

16. The radiation sensor of claim 15, wherein the radiation sensitive material exhibits a greater absorbance of ultraviolet radiation than other adjacent radiation wavelength bands.

17. The radiation sensor of claim 15, wherein a radiation sensitive material absorbance decreases above wavelengths of about 200 nm.

18. The radiation sensor of claim 17, wherein the radiation sensitive material absorbance is at least about ten times higher at a portion of a band of wavelengths between about 100 nm and about 400 nm versus a band of wavelengths above 400 nm.

19. The radiation sensor of claim 15, wherein an absorbance of the radiation sensitive material drops about 80% at wavelengths higher than about 325 nm.

20. A radiation sensor, comprising:
a radiation sensitive material configured to be sensitive to one or more wavelengths of radiation; and
a first electrode and a second electrode connected in series through the radiation sensitive material such that radiation can reach the radiation sensitive material, wherein the sensor includes a three-dimensional shape such that a field of view of the radiation sensor is increased and allows radiation to reach the radiation sensitive material from multiple angles, wherein the radiation sensitive material is a solid piece of radiation sensitive material that is wrapped with the electrodes, wherein the electrodes include comb electrodes.

* * * * *